(12) United States Patent
Pawluczyk et al.

(10) Patent No.: US 7,636,158 B1
(45) Date of Patent: Dec. 22, 2009

(54) OPTIMAL COUPLING OF HIGH PERFORMANCE LINE IMAGING SPECTROMETER TO IMAGING SYSTEM

(76) Inventors: Romuald Pawluczyk, 280 Golf Course Road, Conestogo, Ontario (CA) N0B 1N0; Olga Pawluczyk, 280 Golf Course Road, Conestogo, Ontario (CA) N0B 1N0

(*) Notice: Subject to any disclaimer, the term of this patent is extended or adjusted under 35 U.S.C. 154(b) by 0 days.

(21) Appl. No.: 11/234,252

(22) Filed: Sep. 26, 2005

Related U.S. Application Data

(60) Provisional application No. 60/612,526, filed on Sep. 24, 2004.

(51) Int. Cl.
*G01J 3/02* (2006.01)
*G01J 3/28* (2006.01)

(52) U.S. Cl. .................................. 356/326; 356/328
(58) Field of Classification Search ................ 356/328, 356/326
See application file for complete search history.

(56) References Cited

U.S. PATENT DOCUMENTS

| | | | | |
|---|---|---|---|---|
| 4,157,216 A * | 6/1979 | Plummer | ...................... | 396/17 |
| 4,676,592 A * | 6/1987 | Nishioka et al. | ............. | 385/117 |
| 4,678,332 A * | 7/1987 | Rock et al. | ................... | 356/328 |
| 5,304,791 A * | 4/1994 | Migliaccio | ............. | 250/214 VT |
| 6,005,661 A * | 12/1999 | Machler | ....................... | 356/326 |
| 6,025,873 A * | 2/2000 | Nishioka et al. | ............... | 348/72 |
| 6,069,651 A * | 5/2000 | Tsuyuki et al. | ............... | 348/75 |
| 6,080,101 A * | 6/2000 | Tatsuno et al. | ............... | 600/112 |
| 6,161,035 A * | 12/2000 | Furusawa | ................... | 600/476 |
| 6,580,935 B1 * | 6/2003 | Wach et al. | ................. | 600/310 |
| 6,747,795 B2 * | 6/2004 | Lin et al. | ..................... | 359/385 |
| 6,937,331 B1 * | 8/2005 | Nguyen | ....................... | 356/305 |
| 7,015,444 B2 * | 3/2006 | Kawano et al. | .......... | 250/201.3 |
| 7,038,191 B2 * | 5/2006 | Kare et al. | ............. | 250/227.11 |
| 7,292,390 B2 * | 11/2007 | Lin et al. | ..................... | 359/385 |
| 2001/0052979 A1 * | 12/2001 | Treado et al. | ................ | 356/326 |
| 2002/0067901 A1 * | 6/2002 | Mukherjee et al. | .......... | 385/116 |
| 2002/0085272 A1 * | 7/2002 | Tomioka et al. | ............. | 359/362 |
| 2003/0231305 A1 * | 12/2003 | Zeng | .......................... | 356/301 |
| 2004/0073120 A1 * | 4/2004 | Motz et al. | .................. | 600/478 |

OTHER PUBLICATIONS

Nelson, M.P. and Myrick, M.L. "Single-Frame Chemical Imaging: Dimension Reduction Fiber-Optic Array Improvements and Application to Laser-Induced Breakdown Spectroscopy", 1999, Applied Spectroscopy, vol. 53, No. 7.*

Schiza, M.V., Nelson, M.P., Myrick, M.L., and Angel, M.S., Use of a 2D to 1D Dimension Reduction Fiber-Optic Array for Multiwavelength Imaging Sensors, 2001, Applied Spectroscopy, vol. 55, No. 2.*

Schiza, M.V., Nelson, M.P., Myrick, M.L., and Angel, M.S., Hyperspectral images sensor using a novel 2D to 1D fiber array, 1999, Proc. SPIE, vol. 3860.*

* cited by examiner

*Primary Examiner*—Fannie L Evans
(74) *Attorney, Agent, or Firm*—Bereskin & Parr LLP/S.E.N.C.R.L., s.r.l.; H. Samuel Frost

(57) ABSTRACT

An optical coupling relay system has an imaging optical system having an object plane, an exit pupil and an image plane. An image analyzer has an image plane and an entrance pupil, and a detector is located in a detector plane and contains photosensitive material. An optical coupling relay couples the optical system to the image analyzer, for projecting the image produced by the imaging optical system into the image plane of the image analyzer and simultaneously for projecting the exit pupil of the imaging optical system into the entry pupil of the image analyzer.

25 Claims, 8 Drawing Sheets

Direct coupling of a spectrometer to a microscope

An optical layout of microscope with various image capture options

A typical imaging spectrometer with plane reflecting grating

Direct coupling of a spectrometer to a microscope

Coupling of a spectrometer to a microscope by means of a fiber-optic bundle

Coupling of a number of spectrometers to a microscope by means of a branched fiber-optic bundle Fibers arrangement on both ends of fiber-optic bundle Example of branching of the bundle with three light collecting fibers to three spectrometers Various possible mapping of fibers between ends of bundle

OPTIMAL COUPLING OF HIGH PERFORMANCE LINE IMAGING SPECTROMETER TO IMAGING SYSTEM

PRIORITY CLAIM

This application claims the benefit under 35 USC §119(e) from U.S. provisional patent application Ser. No. 60/612,526, filed Sep. 24, 2004.

FIELD OF INVENTION

This invention pertains to the field of coupling of an imaging optical system in preferred embodiment microscope to a high performance image analyzing system in preferred embodiment to the line imaging spectrophotometer and, more particularly, to conversion of an ordinary optical imaging system such as a microscope into high performance image analyzing system performing high performance spectral analysis able to perform parallel processing on number of adjacent or non adjacent series of measurement points.

BACKGROUND OF THE INVENTION

There is continuously increasing need for precise, non-destructive, non-contact, or remote chemical analysis of selected targets and samples, as well as analysis of distribution of the tested components within the target or sample. This may include identification of chemical composition of the stars or planets, aerial terrestrial reconnaissance, remote pollution detection, remote detection of explosive traces in luggage of airplane passengers and many other applications where chemical analysis of the remote target has to be performed, with exact localization of the point in space were analysis was performed. With scale exception, a similar problem arises in microscopy where the distribution of some chemical components across the microscopic samples has to be determined. Hence, in both cases there is a need for spatial distribution analysis of chemical components across certain large or small areas. In many cases this can be achieved with spectroscopic methods, which extract required information on chemical composition variations from analysis of radiation generated or effected by analyzed adjacent or non-adjacent points of targets or samples. Typically, the radiation from these points is collected by the means of some light collecting optics and delivered to some kind of spectrum analyzer. In the past such analyzers were not able to perform simultaneous analysis on a number of points so that the analysis was performed consecutively point by point. Spatial selectivity of such system was determined by the capability of applied light collecting system, while spectral performance of the system was determined by the performance of both light collecting as well spectrum analyzing components of the instrument The need for detailed quantitative image analysis, especially in astronomy and microscopy has been recognized long time ago for may years, a large number of many photometric and spectrophotometric instruments have been developed, designed and produced. Description of some of these devices as applied in microscopy, developed before year 1980, can be found in book of "Advanced Light Microscopy" (Vol. 3 Measuring techniques) by M. Pluta and in other books and articles. The devices developed before the time of the above publication could not take advantages provided by arrays of photodetectors, which did not exist at that time. To achieve required performance, very sophisticated instruments had been developed and were produced by leading producers of the microscopes. The majority of these instruments were designed for absorbance measurement of microscopic samples, and hence used monochromatic light to illuminate them. As a result, measurement systems of such kind were not able to perform spectral analysis of radiation transformed by the microscopic sample by fluorescence, Raman scattering, phosphorescence or similar effects. For these types of objects, devices able to analyze the spectral composition of the radiation affected by different areas of the microscopic samples are required. In the past, this problem was resolved by consecutive spectral analysis of radiation produced or affected by the sample point by point. Such a point by a point spectral analysis has many disadvantages and many methods have been developed for simultaneous extraction of spectral information for number of adjacent or non-adjacent points of the object or its image produced by some optical imaging system. The systems performing such analysis on a number of adjacent points are usually referenced as imaging spectrum analyzers or imaging spectrometers, while the systems performing the analysis on non-adjacent points are usually called multi-channel spectrum analyzers or multi-channel spectrometers.

In this description both systems will be referred to as imaging spectrometers, while the term multi-channel spectrometer will be reserved specifically to situations when the fact that analyzed radiation has been collected from spatially non-adjacent points is important. There exist a large number of both imaging and spectrum analyzing instruments, which can be used for this purpose.

Similar problems exist in all areas of spectroscopy applications, where information on spatial spectral variability of target or sample are required.

The problem of simultaneous analysis of radiation at different points of targets and samples or their optical images can be addressed in many different ways, depending on the particular needs and technical capabilities available, as will be described below. A method to convert ordinary microscope into a high performance spectrometric system, able to analyze the spectra in a set of adjacent or non-adjacent image points by means of a line imaging spectrometer is disclosed.

Taking into account a large variety of both imaging and spectrum analyzing instruments, a question arises as to how to select and couple instruments from each group to achieve the best possible performance of the final arrangement. Therefore, this is the first object of this invention to provide technical tools and methods for analysis of performance of both imaging and spectrum analyzing instruments to provide the best coupling between them, with an exemplary application to microscopy.

State of the Art in Field of Imaging Spectrometers

The use of imaging spectrometers, allowing for the spectral analysis of radiation transformed by the sample as a result of some physical process, form a mature class measurement method, which have found various technical implementations. There exist instruments with two dimensional image capturing detectors (human eye, photographic film, 2-D array of the photodetectors), which apply spectral band-pass filters placed somewhere in the optical path between the object and the detector to allow radiation within a certain spectral range to reach the 2-D detector. The filters can be consecutively changed to select the radiation, which corresponds to different spectral bands. It is a quite common solution in fluorescent microscopy, for example, and many instrument based on this principle are already available on the market. This is clear that while such filtering provides valued information, the amount of information obtained in such a way is limited by the number of filters, which can be practically used. Recently, several different solutions have been proposed to facilitate the process of spectral band selection. These include continuously moved variable interference filters; interference filters, produced with holographic or thin layer technology, whose spectral band pass can be adjusted by changing the filter inclination to the incident light beam; acousto-optic tunable filters (AOTF), whose spectral band pass is determined by frequency of the acoustic wave applied; liquid-crystal tunable filters, whose spectral band pass is determined by applied voltage; Fourier transform spectrum analyzers, which, by means of a variable optical path interferometer, encode the spectral information in a form of a correlation signal which in an additional step mathematically can be transformed into spectral information. Recently these methods have been enhanced with Hadamard transform spectrometers performing local wavelength coding by mean of small dedicated local diffractive optical elements working in conjunction with 2-D detector array, the signal from which mathematically can be de-convolved into local spectral information. Since both spectral and spatial information are simultaneously coded and registered using the information capacity of the same 2-D detector array it is clear for those skilled in the art that this is achieved as a compromise between spatial and spectral information capacities. All these methods are complemented with line imaging spectrometry, able to provide high quality spectral information for a set of points aligned along a straight or curved slit. Because of recently achieved unsurpassed spatial and spectral performance, this technique is particularly useful for precise spectroscopic analysis of the various targets and samples. To be able to take full advantage of such a technique; however, the optical coupling of the line imaging spectrometer to the imaging system such as microscope becomes highly important. In principle two coupling methods are possible: the direct coupling of the imaging system to spectrometer through the projection of an image produced by the imaging system onto a slit plane of the line imaging spectrometer and coupling the light from the image plane of the imaging system to the slit of the spectrometer by the means of optical fibers.

Therefore, it is the primary objective of this invention to provide means for efficient transfer of radiation between the image plane of the imaging system and the spectrometer slit plane providing either the highest possible spatial and spectral resolution for an image line using direct image projection by the imaging system onto the slit plane of a line imaging spectrometer or by providing a flexible connection and freedom in selection of the analyzed points of the microscopic sample using fiber-optic connection between the imaging system such as telescope or microscope and line imaging spectrometer. The second objective of the invention is to provide fiber optic connection between the imaging system such as telescope or microscope and line imaging spectrometer with spatial configurations of fibers different from the spatial configuration of fibers in the spectrometer slit plane. The third objective of the present invention is to provide means to perform spectral analysis of samples observed with different imaging systems by a single line imaging spectrometer. The fourth objective of the invention is to provide means to perform spectral analysis of the samples in a single or plurality of imaging systems by the means of a number of spectrometers, each of which performs the analysis in different spectral ranges. These and other advantageous solutions related to coupling one or a number of imaging systems to one or a number of line imaging spectrometers will become apparent from following detailed description of the invention, attached drawings and claims and sub-claims of the invention.

In this description coupling of the microscope to line imaging spectrometer will be used as an example, but the same principle can be used for coupling any imaging system, producing a real optical image, to the line imaging spectrometer.

BRIEF DESCRIPTION OF THE DRAWINGS

For a better understanding of the present invention and to show more clearly how it may be carried into effect, reference will be made, by way of example, to the accompanying drawings, in which.

DETAILED DESCRIPTION OF EMBODIMENTS OF THE INVENTION

Figure 1:
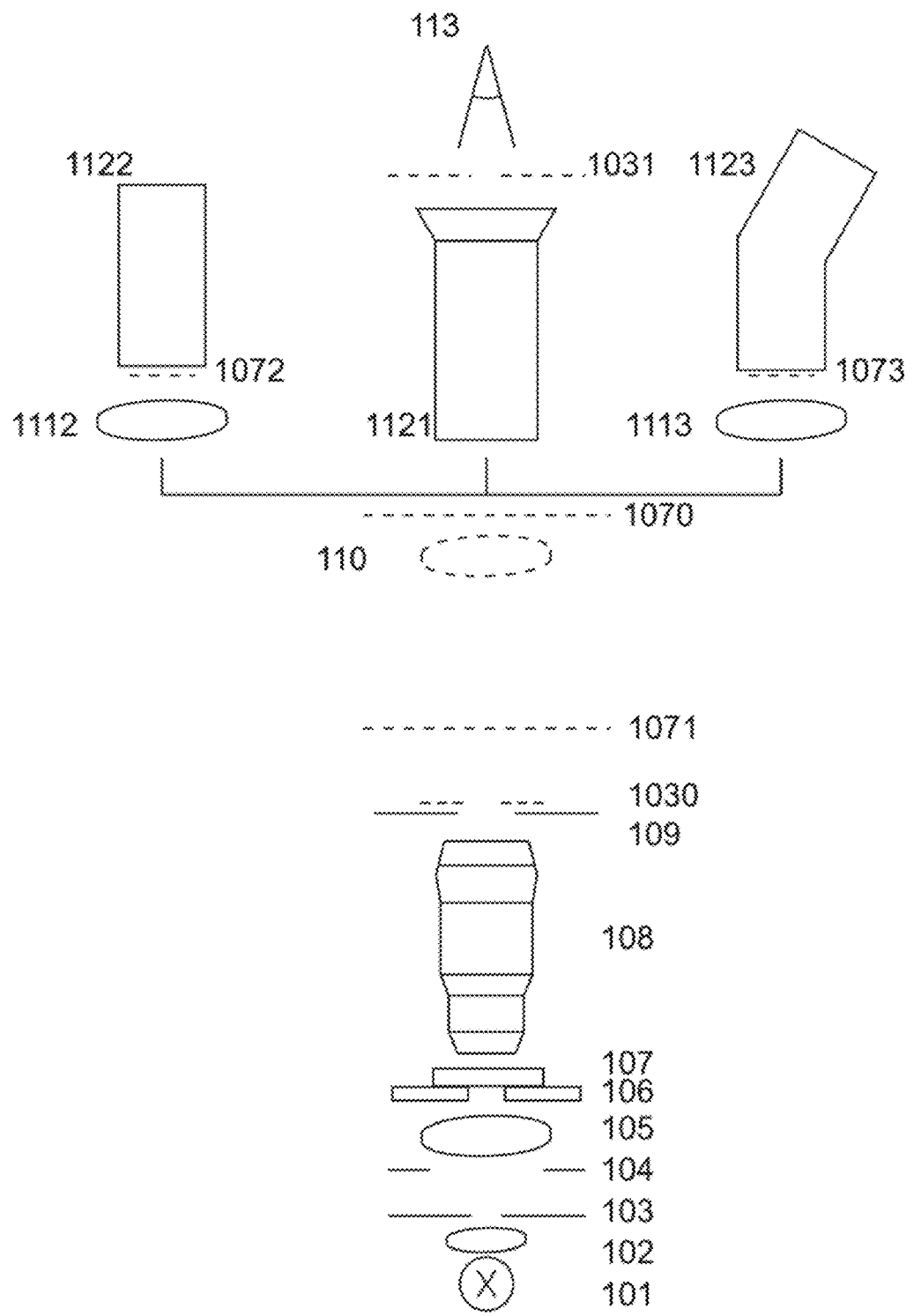
FIG. 1 shows a schematic diagram of a microscope and couplings for connection to various kinds of the image capturing devices.

The present invention provides effective means for coupling an optical imaging system such as telescope, photographic or TV camera objective, microscope or any other imaging system, which creates a real image of the target or sample with some kind of image analyzer, a line imaging spectrometer. Each imaging optical system, predestined for the image registration by some means produces in space, a real image of the sample or target where some kind of image capturing element such as photographic material, photosensitive area of vidicon, array of photodetectors or other similar device is placed to produce technically recognizable physical reaction correlated to spatial intensity distribution of electromagnetic radiation (light). Depending on the situation, the registered image can either be demagnified (TV cameras, photographic cameras, telescopes), registered without change of scale (some photographic and TV cameras) or magnified (microscopes, some photographic and TV cameras). Images produced by such optical devices are often not optimal for direct visual observation and to improve their visibility they are either projected on some screen (diffusers in photographic cameras) or observed by means of eyepiece which most often produces a comfortable visual observation of a virtual image of the sample or target (telescopes and microscopes). Sometimes, there is a need to perform some additional operations with captured images (spectral analysis for example) by the means of specialized optical device such as spectrometer, interferometer, radiometer, photometer and others. A problem arises of how to couple such devices to the imaging system in a way, which secures the extraction of maximum information using minimal resources. Since all imaging optical systems produce a real image of the target (within this description, target will mean any physical object large or small, whose image is taken with some optical device like telescope, photographic camera, microscope and similar) their coupling with additional optical devices imposes similar problems, which will be discussed in details in relation to a microscope as an example.

The performance of any optical imaging system, including microscopes, can be expressed through the specification of a number of physical parameters, which include a spectral range of used radiation; angular or linear field of view; F# (F number) or numerical aperture, which expresses capability of the optical system to collect light and usually determines the angular or linear dimensions of the smallest detail the system can resolve; and optical or contrast transfer function, instead of which spatial resolution, which is directly related to the limit of spatial frequency transferred by the system is often provided.

The image produced can be characterized in similar way by providing the spectral range $\Delta\lambda$ of the radiation used to produce the image, size of the image $\Delta x$ by $\Delta y$, convergence angle $\theta$ of the radiation producing the central spot of the image (which is related to F# or aperture of the used optical system) and the radius $\rho$ of the smallest detail in the image, determined by resolution of the system. All these details are clarified in the following example.

The useful spectral bandwidth $\Delta\lambda$ of an optical system is limited either by the spectral range of transparency of materials used, by the sensitivity in the spectral range of detectors used or by the design of the instrument, which causes that the system meets established technical requirement only for radiation in a certain spectral range.

The image size $\Delta x$ by $\Delta y$ is usually determined by optical design of the optical system and gives the size of the area within which the optical systems meets technical requirements.

The convergence angle $\theta$ of the radiation producing the central spot of the image is determined by diameter D of the exit pupil of the optical system and the distance I from the pupil to the image plane. The $\sin(\theta/2)$ gives the numerical aperture of the image building beam and for aberration free optical system determines the radius $\rho$ of diffraction spot of a point object in the image plane. For a point object placed at infinity the convergence angle $\theta$ is related to pupil diameter D, focal length f of the lens and its F#=f/D in the following way:

$$\theta = 2a\tan(D/2f) = 2a\tan(1/2F\#) \sim 1/F\# \quad (1)$$

and numerical aperture N.A.$_i$ of the beam forming the image in air is:

$$N.A._i = \sin(\theta/2) = \sin(a\tan(D/2f)) = \sin(a\tan(1/2F\#)) \sim \sin(1/2F\#) \sim 1/2F\# \quad (2)$$

In the case of microscopes, the numerical aperture N.A.$_i$ of the beam forming the image is related to the numerical aperture of the objective N.A.$_{ob}$ providing magnification $M_{ob}$ as follows:

$$N.A._i = N.A._{ob}/M_{ob} \quad (3)$$

The radius $\rho$ of diffraction spot of the point object in the image plane for imaging system is given by:

$$\rho = 1.22\lambda/N.A._i \sim 2.44\lambda F\# \quad (4)$$

In microscopes, the contribution of the condenser improves resolution by factor of two and in the image plane of the objective the resolution of the microscope $\rho_m$ is given by:

$$\rho_m = 0.61\lambda M_{ob}/N.A._{ob} \quad (5)$$

If the microscope contains additional optical components providing additional magnification $M_m$, it will influence both the numerical aperture N.A.$_i$ of the beam forming the image, which will take value:

$$N.A._i = N.A._{ob}/(M_{ob}M_m) \quad (3a)$$

as well as the radius $\rho_{ma}$ of diffraction spot of the point object in the image plane of the microscope with additional optical system will become:

$$\rho_{ma} = 0.61\lambda M_{ob}M_m/N.A._{ob} \quad (5a)$$

This is equivalent to resolution $\rho_o$ in the object plane of the microscopic objective:

$$\rho_o = 0.61\lambda/N.A._{ob} \quad (5b)$$

The same is valid for the aberrated optical imaging system with the exception that the radius of the diffraction spot has to be replaced with RMS radius of the point spread function, all other considerations remain unchanged.

Another parameter of every optical system particularly important in systems used for coupling with other optical systems is the position and size of the exit pupils, which together determine the convergence angle $\theta$. In simple optical systems the entry and the exit pupils practically coincide with the edge of aperture D, limiting the active area of the used lens. In more complex optical systems, these two pupils can be separated and placed inside of the system or at certain distance from the last lens as in microscopic objectives, for example. Relative position of entry and exit pupils of coupled optical system is very important, since in case of their wrong positions it may lead to vignetting.

Once the real image is created, its position and size as well as the position and size of exit pupil is identified and properties of the image are determined (RMS radius $\rho$ of point spread function and the convergence angle $\theta$) it becomes irrelevant what optical system was used to produce the image, and from this point the coupling optimization can be performed without further reference to the imaging optical system. Hence, further analysis will be performed using the microscope as an example but all conclusions are applicable to all other imaging optical systems such as telescopes, objectives for photographic or TV cameras and all other imaging optical systems.

Optical microscopes have reached such degree of standardization that optical layouts of microscopes produced by different companies do not show significant differences. As a principle, the modern microscope, FIG. 1, contains a source of radiation 101 (here and everywhere in the following text the first digit in reference number refers to number of the drawing, the second and third is a component specific number, while fourth and further numbers refer to different variations of the same component), a collector 102, a field diaphragm 103, an aperture diaphragm 104, condenser 105, an optical stage 106, with a sample 107, a microscope objective 108, which creates a real image 1070 of the sample at certain finite, or infinite distance from the objective 108, having an exit pupil 109. In the case of the microscopes with objectives corrected for infinity it may also contain an auxiliary lens 110, which together with the objective 108 produces the image of the sample in the image plane 1070. Depending on a method of the image registration this image can be either directly observed by a human eye 113, placed at the exit pupil 1031 of the eyepiece 1121, which produces an imaginary magnified image 1071 of the sample at the best vision distance of the human eye 113; can be projected as a real image 1072 with magnifying, non-magnifying or de-magnifying projecting lens 1112 onto a surface of a photosensitive area of an image capturing device 1122 containing such components as vidicon, CCD array, photographic film or other similar media; or delivered by means of a relay lens 1113 as an real image 1073 to some image analyzing system 1123 (spectrometer, for example) as in the case of the present invention.

While it may not be true in the case of other optical systems such as the Hubble telescope, which has been designed to work with detector arrays exclusively, microscopes and many other optical imaging systems are usually optimized to work together with an optical system of a human eye and have to be specially adapted for cooperation with other image capturing devices such as photographic, TV or digital image capturing camera with 2-D array of photodetectors. The problem is usually resolved by replacement of the eyepiece 1121 with some specialized magnified, non-magnified or de-magnified relay lens 1112, which relays the microscope image 1070 produced to the image capturing device 1122 in a form of a suitably magnified, non-magnified or de-magnified image 1072. Such a relay lens is usually optimized to provide the best possible image for the selected image capturing device applied, and therefore is usually not suitable for other image capturing devices. As long as the relay lens captures all radiation collected by the combination of microscopic objective and auxiliary lens and uses it to produce an image of acceptable quality, registered by the image captured device, the relay lens fulfills its role and no further considerations are required.

Figure 2:
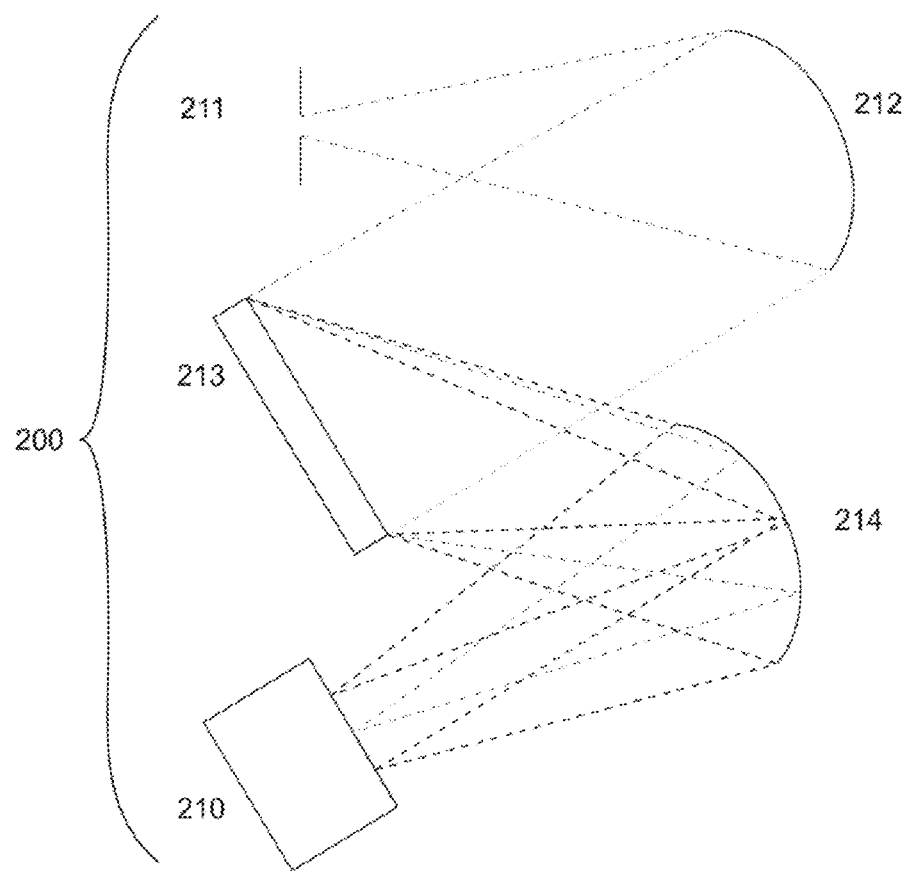
FIG. 2 shows a schematic diagram of one of many possible implementations of a line imaging spectrometer.

However, if radiation collected by the objective/auxiliary lens combination has to be further processed with some additional optical system 1123, as a line imaging spectrometer, for example, the situation changes. With exception of very simple but low performance imaging spectrometers containing suitably corrected concave diffraction grating, which simultaneously plays the role of a radiation collecting optics, diffraction grating and spectral image forming optics, the more advanced imaging spectrometers have separate optical systems to perform these functions as is shown in an example in FIG. 2. Thus, typical line imaging spectrometers consists of a slit 211, of a radiation collimating optics 212, which for each point of the slit transforms the emerging divergent beams into the collimated beams of radiation delivered to a diffraction grating 213; the diffraction grating decomposes each collimated beam into spectral components sent in different directions in the form of collimated monochromatic beams. These monochromatic beams are collected by focusing optics 214, which for each point of the slit focuses each spectral component to the smallest possible spot, producing in such a way a line spectral image for every point of the slit, together forming 2-D radiation distribution pattern, whose one coordinate axis represents position of the points along the entry slit, while the second axis represents wavelength of the radiation. Light intensity at each point provides information regarding how much radiation of certain wavelength was delivered to selected point of the slit. This light intensity distribution can be registered with 2-D detectors array 210, providing in such a way simultaneous spectral information for each point of the slit, in other words, producing a spectral image for these points of the object, which were projected on the slit.

Another example of a line imaging spectrometer is described in US Patent Application US2005/0162649 A1, 2005-07-28 entitled "Multi-channel spectrum analyzer" and incorporated here by reference.

Thus, a problem arises as to how to couple an existing imaging system such as a microscope, photographic objective or telescope with such specialized image analyzer such as that described in the above US Patent Application, in a way to provide maximum information. While there exists a large number of scientific papers and patents describing different imaging spectrometers, including these performing simultaneous spectral analysis for each point of image projected on the slit of the line imaging spectrometers, the method of optimal coupling of line imaging spectrometers to imaging optical system is not disclosed.

Figure 3:
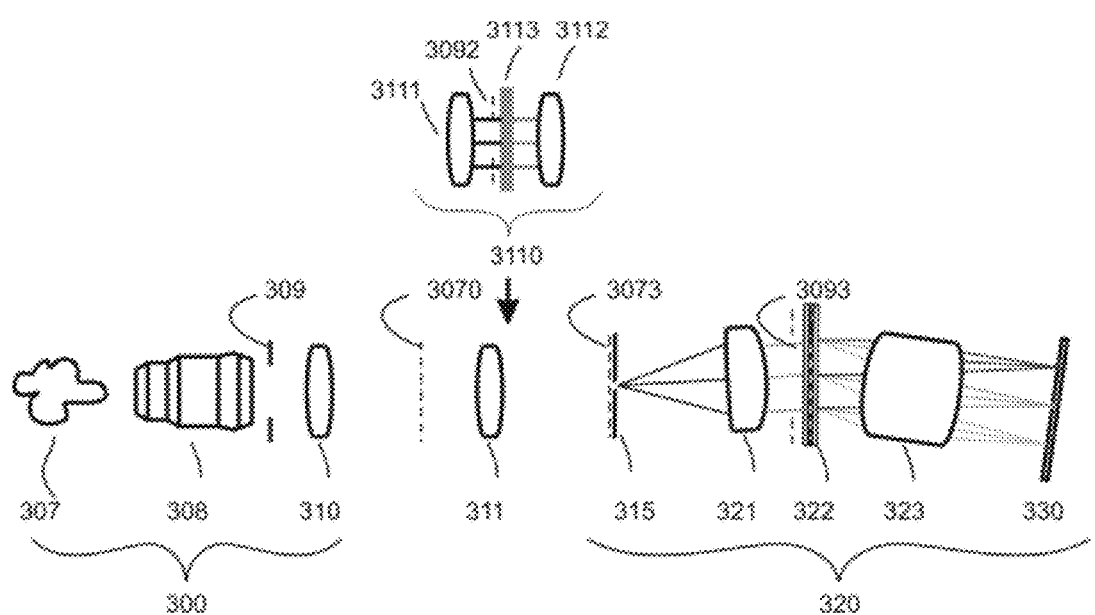
FIG. 3 shows a schematic diagram of one embodiment of a coupling between a microscope to a line imaging spectrometer in preferred embodiment with a holographic volume transmission diffraction grating.

In principle, there exist two methods, which can be used for this purpose: direct coupling and coupling by means of a fiber optic bundle. Both methods posses their own advantages and disadvantages and can be used as required. The direct method is illustrated in FIG. 3. According to the present invention, direct coupling between the imaging system 300, in a disclosed embodiment a microscope, and the image analyzer 320, in a disclosed embodiment a line imaging spectrometer, is performed by mean of relay lens 311. The schematically presented microscope 300 consists of an object 307, an objective 308 having exit pupil 309, and auxiliary optical system 310, producing a magnified real image 3070, which in a form of another magnified real image 3073 is projected by means of relay lens 311 onto entrance slit 315 of the spectrometer 320. In this schematic presentation the spectrometer consists of entrance slit 315, collimating optics 321, which collimate the light beam for each point of the slit, diffraction grating 322, which angularly separates light with different wavelengths for each point of the slit, focusing optics 323 producing for each point of the slit a rainbow like pattern, which in a form of two dimensional image presenting spatial coordinate along the slit in one direction and spectral information in perpendicular direction is registered with 2-D array of detectors 330. The role of the relay lens is to produce the real image of the sample in the spectrometer slit plane and simultaneously secure efficient transfer of light from the microscope to the spectrometer. This can be achieved only if the relay lens 311 together with collimating optics 321 of the spectrometer produces the real image 3093 of the exit pupil 309 of the objective 308 in plane of the diffractive grating 322. Schematically presented as a single lens 311, in reality the relay lens may contain a number of optical elements as shown in insert 3110, where relay lens consists of two set of lenses 3111 and 3112. The first set 3111 transforms the diverging from each point of the image 3070 light into a bundle of parallel beams, simultaneously producing an intermediate image 3092 of the pupil 309. The second set 3112 focuses back parallel beams into the image 3073 of the object 307, projected onto slit 315 of the spectrometer 320, simultaneously together with collimating optics 321 of the spectrometer 320 producing a real image 3093 of the exit pupil of the microscopic objective in the plane of diffraction grating 322. Those skilled in the art would appreciate that active area of the grating should be larger than the projected on the grating image of the exit pupil of the optical imaging system, exit pupil of the objective in this example. The collimating optics 323 having the entrance pupil placed in the grating plane 322 collect the diffracted light and focus it on the sensitive surface of the image capturing medium 330, 2-D array of the detectors in preferred embodiment, for each point of the slit and for each wavelength of working range of the spectrometer, producing a spot of size determined by the performance of a whole optical system starting with object and ending with the array of the detectors. It will also be understood by those skilled in the art that the size of the entrance pupil of the focusing optics of the spectrometer should match the size of the grating image of the exit pupil of the imaging optical system.

For these skilled in the art it is well known that to distinguish two closely placed spots of the same size, with spot intensity distribution close to a Gaussian, the sampling step, which in case of CCD array is equivalent to the pixel size, should not be larger than a half of the spot diameter, i.e. should be smaller than RMS radius $\rho$ of the spot. Therefore, the relay optics used for coupling the imaging and the image analyzing systems should be selected to produce the smallest image spots with RMS radius not smaller than a pixel size, in the plane of a detector array of the image capturing media. In such a way, four pixels will be necessary to register the smallest image spot (If pixels were arranged according to a hexagonal pattern, three pixels would suffice). The above leads to a conclusion that if we want to see resolved details of radius $\rho_o$ in the object plane, the total magnification of the system M being a product of magnification of the imaging system $M_i$, relay optics, (which can consist of multiple lens system) $M_r$ and spectrometer $M_s$ should fulfill condition (6), assuming that the optical system has capability to resolve details of radius $\rho_o$ in object plane:

$$M=M_i M_r M_s >= d/\rho_o \quad (6),$$

where d, is the pixel size in the direction under consideration and $\rho_o$, is the required resolution in the object plane in that direction. In relation to the image plane of the imaging optical system where it produces an image characterized with RMS spot radius $\rho$, the above condition takes shape:

$$M_r M_s >= d/\rho \quad (6a),$$

It immediately follows from the above, that magnification of the relay optical system $M_r$ used to couple imaging and analyzing parts should fulfill the condition:

$$M_r >= d/(\rho M_s) \quad (7)$$

At the same time, the collecting angle of the relay lens should match the divergence angle of light leaving the image produced by the optical imaging system. This is automatically secured if non obscured image of the exit pupil of the imaged system is projected onto a grating and is matched by the size of the entrance pupil of the focusing optics of the spectrometer.

Coupling of a microscope to an image analyzer produces some specific problems related to the fact that the magnification of a microscope can be easily changed by the switching of the microscope objectives. On the other hand, modern microscopes possess a number of ports, which can be used for coupling of the microscope to a imaging spectrometer. These ports include a port for monocular or binocular attachment, a port for an eyepiece, an auxiliary port in trinocular, or specialized ports for TV and photographic cameras. In principle, all these ports can be equipped with suitable relay lenses and used for direct coupling to spectrometers, but the TV and photographic cameras ports are the best suitable for this purpose.

As it was explained earlier, the resolution $\rho_o$ of the aberration free microscopic objective at wavelength $\lambda$ is determined by the numerical aperture N.A. of the applied objective (5b); therefore, to secure required resolution $\rho$, a microscopic objective of the numerical aperture:

$$N.A. > 0.61 \lambda/\rho_o \quad (8)$$

should be used. Since there is a strong correlation between magnification of the objective $M_{ob}$ and its numerical aperture as can be found in technical specifications of the microscopic objectives available on the market, the availability of objectives fulfilling the relation (8) determines the applicable magnification of the applied microscopic objective $M_{ob}$. The total magnification M of the microscope/relay system/spectrometer can be expressed as a product of magnifications of its components: magnification of the chosen objective, $M_{ob}$; the system magnification of the microscope $M_m$ (including magnification of the auxiliary lens); magnification of the image relay lens, $M_r$; and magnification of the spectrometer system, $M_s$:

$$M = M_{ob} * M_m * M_r * M_s \quad (9)$$

Since the second and the last values in the above product are constant for a given combination of the microscope/relay system/spectrometer and objective selected to secure the required resolution, it is clear that the magnification $M_r$ of the relay lens has to satisfy the condition:

$$M_r = M/(M_{ob} * M_m * M_s) \quad (10a)$$

Taking into account all relations and the fact that there exists a certain relation between $N.A._{ob}$ of the objective and its magnification which can be expressed as $M_{ob} = k*N.A._{ob}$, the relation (10a) can be rewritten as:

$$M_r = d/(0.61 * \lambda * k * M_m * M_s) \quad (10b)$$

This determines the required magnification of the coupling optical system for microscopes. The above result has been obtained under the assumption that the microscope produces diffraction limited image and that the coupling lens and the spectrometer system are also aberrations free and have capability to transfer to the photodetector plane the image of a point monochromatic source produced by the microscope without additional disturbances.

Table 1. Example of relations for a typical series of microscopic objectives for standard wavelength 1 μm (for other wavelengths results in columns 5 and 6 have to be multiplied by wavelength measured in micrometers).

| $M_{ob}$ | $N.A._{ob}$ | $M_{ob}/N.A._{ob}$ | N.A. on exit | Normalized resolution in object plane [μm] | Normalized resolved detail in image [μm] |
|---|---|---|---|---|---|
| 4 | 0.08 | 50 | 0.020 | 7.63 | 30.5 |
| 6.3 | 0.08 | 79 | 0.013 | 7.63 | 48.0 |
| 16 | 0.25 | 64 | 0.016 | 2.44 | 39.0 |
| 20 | 0.4 | 50 | 0.020 | 1.53 | 30.5 |
| 40 | 0.45 | 89 | 0.011 | 1.36 | 54.2 |
| 63 | 0.65 | 97 | 0.010 | 0.94 | 59.1 |
| 100 | 1.25 | 80 | 0.013 | 0.49 | 48.8 |

As follows from Table 1, depending on the objective, $k=M_{ob}/N.A._{ob}$ might vary between 50 and 100. Equation (10b) leads to a conclusion that in the case of a microscope, depending on the objective, the optimal magnification of the coupling relay lens may vary by a factor of two, even when the magnification of the objectives varies by a factor of 25 and the numerical aperture by a factor of 15. This means that using coupling relay lens designed to work with an objective having k-factor close to 75, optical coupling conditions will be practically satisfied for all other objectives. Therefore, the ideal solution would consist of a relay lens with variable magnification varying by factor of two, from magnification which corresponds to factor k=100 to k=50.

Under earlier defined conditions, the image produced by a microscope together with the coupling relay lens (projected onto an object plane of the image processing system) will have the total magnification $M_t$:

$$M_t = d^* N.A._{ob}/(0.61^* \lambda^* M_s) \tag{11}$$

At the same time, the numerical aperture $N.A._I$ of the converging beam producing this image will be equal to:

$$N.A._I = N.A._{ob}/M_t = 0.61^* \lambda^* M_s/d \tag{12}$$

Hence, to be able to catch all light transmitted through the slit, the numerical aperture of the entry of the spectrometer should not be smaller than the above value. For a typical image analyzing system, magnification of the spectrometer is close to one, pixel size in an array of photodetector is in the range of 10 microns and the wavelength of the detected light is about half a micron. These values give an $N.A._I$ of about 0.03 which roughly corresponds to F#~16, which is much larger than that for the majority of spectrometers available on the market. Such large F# means that when typical spectrometers are optimally coupled to microscopes, the aperture of the spectrometers will be underfilled. This may raise concerns about limitation of resolution caused by the reduction of the used active area of the grating. The example below shows, however, that the impact of this effect is much smaller than other factors, but that it should be taken into account in applications where high spectral resolution is required. An example of a typical spectrometer having a focusing lens with a focal length about 100 mm gives the beam diameter on the grating about 6 mm. For grating having 500 line pairs per mm this is sufficient to obtain spectral resolution about $\lambda/1600$, while for grating having 1500 line pairs per mm this can provide resolution over $\lambda/5000$.

Similarly, the width of monochromatic slit image in the registration plane should be not wider than the pixel width $d_w$ in the direction of dispersion. Therefore, the width of the slit $w_s$ should meet the condition:

$$w_s = d_w/M_s \tag{13}$$

When conditions (11), (12) and (13) are satisfied, the system performance meets the initial spatial resolution requirement.

The spectral resolution of the system is determined by the capabilities of the spectrometer, which are primary determined by dispersion of the grating and optical configuration of the instrument.

As it was explained earlier, line imaging spectrometers produce spectral information for all points of the image projected on a slit of the spectrometer. Hence, measurement with such systems provides spectral information for points of the object placed along the line, whose image coincides with the slit. However, if the object whose image is projected onto a slit remains unchanged for a certain period of time, such a line imaging system can be also used for spectral analysis of 2-D sample by successful line by line collection of the spectra with some scanning system, which translates the image of the sample across the slit in a predetermined way. In the preferred embodiment, this is achieved by linear translation of the sample in direction perpendicular to the slit length, by a step equal to a half of the required resolution in the object plane, which corresponds to translation of the image in the photodetector array plane by a width of a single pixel in direction of the dispersion.

For these skilled in the art, it is evident that similar conditions are applicable to coupling of any an optical imaging system to any imaging spectroscopic system, where there is a need for simultaneous spectrum collection for a number of points, such as aerial remote sensing, photography, astronomic observation and any other. This is also applicable to any scanning imaging system where the spectral image of 2-D scene is constructed as a composition of spectra of consecutively collected line images, resulting in four dimensional parallelepiped where two axes provide coordinates of the point under consideration in the object plane, third coordinate corresponds to wavelength and fourth represents intensity of radiation of given wavelength at given point. Such way of representing data is usually referred to as hyperspectral imaging.

The switching of an image analyzer to different lines on the object surface can be performed in many different ways, as is known for these skilled in the art, and depends on the tested object and optical system used for observation. In case of a microscopic image, this can be done by, but not limited to, a simple relocation of the sample across the field of view in direction perpendicular to the slit, or by one of many optical scanning methods including deflecting and rotating mirrors, various kinds of electro-optical and acousto-optical deflectors any other means used for moving an image in one direction.

While direct coupling of the imaging system, a microscope in particular, to a spectrometer potentially provides best performance, in many respects it lacks flexibility. Some applications require more flexible coupling, and in these applications coupling with a optical fibers could be preferred. The present invention provides various ways of such coupling. The simplest way is to put an end of optical fiber bundle with fibers arranged along a straight line directly into a real image plane of the microscope and to bring another end of the bundle, with the fibers placed in exactly the same order as on entry side, to the slit of the spectrometer. Unfortunately the spatial resolution of such a line of fibers is determined by the total diameter of the applied fibers and may not match either the requirement or the resolution of an image produced by the imaging system, the microscope in particular. For this reason, matching of these two parameters by means of a suitable optical relay system might be necessary.

The simplest way to couple an image produced by an imaging optical system to a image analyzing system is to use a single fiber whose one end is placed in the image plane of the imaging system and the second end is placed in the object plane of the analyzing system, slit of the spectrometer, for example. This approach does not provide any information about spectral composition in other points of the image, unless (for a stable object) a full two-dimensional scanning of the image is performed. In such a case there is no need to use a 2-D array of the detectors and a linear array would be sufficient. In this respect, application of a bundle with multiple optical fibers provides significant advantages.

Figure 4:
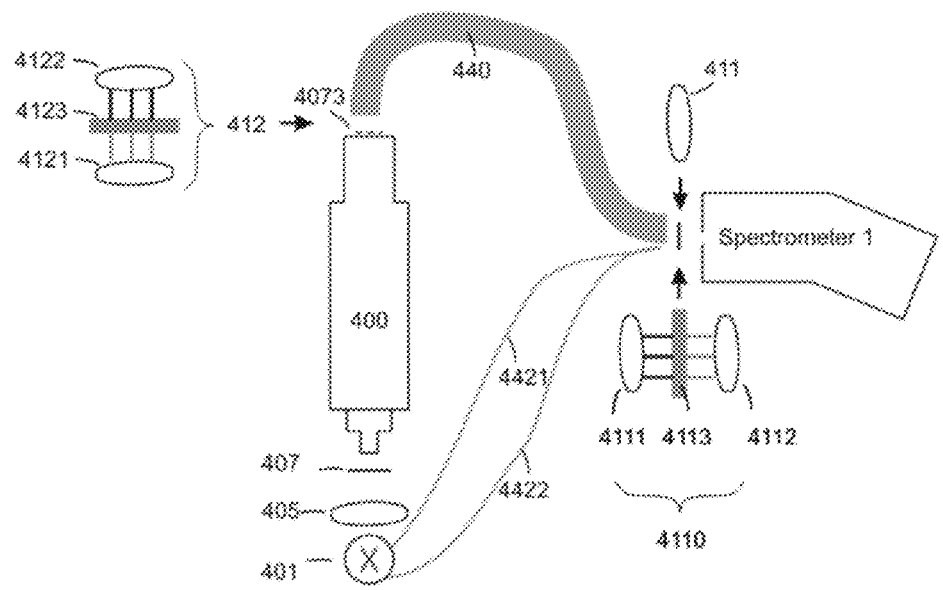
FIG. 4 shows a schematic diagram of another embodiment in which the radiation from a real image produced by a microscope is captured by the entry face of a fiber optic bundle and delivered directly or indirectly to an entry slit of a line imaging spectrometer.

An example of coupling in the preferred embodiment of a microscope to a line imaging spectrometer by the means of a fiber optics bundle with multiple optical fibers is shown in FIG. 4. On this drawing, the imaging system is shown in a form of a simplified microscope consisting of a light source 401, a condenser 405, an object 407 and a microscope body 400 with a marked image plane 4073, while spectrometer 1 represents an image processing unit. The light from the imaging system is delivered to the image processing unit by means of a fiber optic bundle containing three branches: a main branch 440 and two auxiliary branches 4421 and 4422. Each branch may contain any number of optical fibers. One end of each branch is used to collect light, while the other ends are bundled together and deliver captured light to the spectrometer. The main branch 440 captures light either directly from the image plane of microscope or by means of come additional optical relay system 412, similar to the relay optical system 311/3110 of FIG. 3, consisting of at least one, possible multi element lens or, as shown in FIG. 4, a pair (4121 and 4122) of single or multi element lenses with space between them to put some additional optical components. The auxiliary branches also directly or by the means of some relay optical system (not shown on the drawing) capture various reference signals as required, such as from the light source 401, other points of the imaging system (microscope), separate light sources as spectral lamp (also not shown on the drawing) for continuous monitoring of wavelength calibration, from free space (if background subtraction is required), from photometric reference source or from any other points of interest. The number of auxiliary branches can be as large as required. On the common end, the fibers from all branches are aligned into a single column, which either replaces the spectrometer slit, is placed directly in front of the slit, or whose image is projected onto the slit by means of some relay optical system similar to 311/3110 of FIG. 3. The relay system can be done in a form of a single or multi-element projecting lens 411 or more complex relay system 4110 consisting of a pair of a single or multi-element projecting lenses 4111 and 4112, with space between them for additional optical components such as polarizers, attenuators, various kind of filters, beam splitters and other optical components as required for performance enhancement of the image analyzer, the spectrometer in this case.

As described above, the fiber-optic bundle (FIG. 6) used for this purpose has a main branch containing majority of arranged in line optical fibers and as many as required auxiliary branches containing one or a few fibers each. At the exit end all fibers are precisely aligned into a single line in such a way that the fibers from each branch are grouped together and all groups from auxiliary branches are placed on one end of the line, possible separated from fibers from the main branch by empty space or inactive fiber for easier recognition of spectra of light from auxiliary branches. The fibers from the main branch are also grouped together and are arranged in exactly the same order as on entry end, producing a line image of the object similar to that obtained in earlier described system with the direct coupling, with additional spectral rows presenting spectra of light delivered by fibers from the auxiliary branches. The auxiliary branches can collect the light from different points of optical system or from separate light source such as lasers or spectral lamp and can be used for continuous monitoring of wavelength calibration of spectrometer.

Thus, the present invention also provides a fiber-optic bundle with a single line of fibers coming from the image and having at least two additional branches for reference signal, one of which is used to provide wavelength calibration signal.

The coupling of the imaging system to the image analyzer by means of the fiber-optic bundle can create some problems, however, related to the fact that the typically applied optical fibers have larger diameter than both the resolved points in the image of the optical system as well as the resolution (pixel size) in two-dimensional image capturing device such as the spectrometer. Applying the same principle as in the case of photodetector array, that a two by two group of fibers is required for each resolved spot of radius $\rho$ in the image, the optical system 412 performing coupling of light from the image produced by an optical imaging system (in this example an microscope) to the fiber-optic bundle, should provide magnification $M_{if}$:

$$M_{if}=d_f/\rho \tag{14}$$

As it follows from the Table 1, in microscopes the normalized product $\rho_0 M_{ob}$ for given wavelength varies between $30\lambda$ and $60*\lambda$, assuming an average constant value, roughly equal to $40*\lambda$, this leads to conclusion that magnification $M_{if}$ of the relay lens on the microscope side with additional magnification $M_m$ of microscope system should meet the condition:

$$M_{if}=0.025d_f/(\lambda M_m) \tag{15}$$

Since the diameter of fibers presently applicable for these needs is about 60 μm, this determines the required magnification as $1.5/(\lambda M_m)$, which for wavelength 0.5 μm and additional microscope magnification 1.5 is equal to 2. Therefore, using present day technology the relay lens with 2 times magnification is required on the microscope side to perform an optical coupling of the visible image to a fiber optic bundle containing fibers about 60 μm in diameter and proportionally larger for fibers of larger diameter. The required magnification decreases for longer wavelengths and increases for shorter. If diameter of the fibers in micrometers was equal to:

$$d_f=40*\lambda*M_m \tag{16}$$

no additional magnification would be required and the fiber optic bundle could be placed directly in the image plane. For a typical microscope with $M_m$ equal 1.5 and central wavelength 0.5 μm fibers of diameter of 30 μm would be required. This diameter would increase to 60 μm for wavelength of 1 μm and decrease to 20 μm for UV radiation with wavelength 0.35 μm. Using fibers of these diameters for specific applications would greatly simplify the coupling of microscopes to spectrometers by the means of fiber optic bundles.

Therefore, in one aspect of the present invention, regardless of the applied objective, only one relay lens with magnification given by equation (15) is used for coupling the microscope image to the spectrometer.

In another aspect, the invention provides an optimal diameter of fibers (16) for direct coupling of the microscope image to a fiber optic bundle.

Similarly, an optical coupling system 411, performing coupling of light from a fiber-optic bundle to the slit of the spectrometer should secure magnification $M_{fs}$ such that considering the magnification $M_s$ of the spectrometer the image of the end of the single fiber as produced in monochromatic light in photodetector plane, should be equal to the size d of a resolving element (pixel) of the photodetector, otherwise resolution of detector array would not be fully utilized:

$$M_{fs}=d/(M_s d_f) \tag{17}$$

Since the total diameter of the standard fibers is usually larger than the pixel length in the slit direction, and the spectrometer magnification is close to one, this means that the magnification of the applied optical relay system on spectrometer size should be smaller than one.

Such a precise matching of the diameter of the fibers to the pixel size makes the system extremely vulnerable to fiber-optic bundle defects. To make it less sensitive, bundles with fibers of the smallest possible diameter would be preferred, to have more than four fibers carrying information presented by a single resolution spot of image, and, consequently, more than one fiber projected on a single pixel. For fibers of larger diameter this can be achieved by applying a relay lens of larger magnification between the microscopic image and the fiber-optic bundle and suitable de-magnifying relay lens between the fiber-optic bundle and spectrometer, chosen in such a way that two pixels in one direction (four pixels in two dimensions) are used to register a single resolution spot of the object projected on the photodetector array. Such solution however would require fiber-optic bundles of large dimensions.

As it was mentioned earlier, the magnification of the image by a microscope objective proportionally decreases the aperture angle of the beam producing the image, as seen in fourth column of Table 1 to a value, which depending on objective applied, varies between 0.01 and 0.02 (on average about 0.015). The aperture is further reduced by consecutive magnification of the microscope system (typically 1.5 times) and relay lens used to project microscopic image on an end of a fiber-optic bundle. As a result, the aperture angle of the light beam coupled to the fibers is very small, and if it was preserved in the fibers, even after increase caused by possible demagnification of the relay lens used on spectrometer side of the system, could not fill-in the aperture of the spectrometer resulting in poor spectral resolution. It is known for these skilled in the art that if numerical aperture of fibers is larger than numerical aperture of the introduced light beam, the latter increases as the light propagates along the fiber due to diffraction and mode cross-talk in the fiber. The bending and coiling of the fiber accelerates the effect.

Therefore, the invention also provides a way to increase the numerical aperture of the light beam entering an image analyzer (spectrometer) by bending and coiling fiber optics bundle used to transfer light from the image forming optical system to the image analyzer. In particular case of coupling of a microscope to the spectrometer this allows to achieve a higher spectral resolution in smaller size spectrometer.

Figure 5:
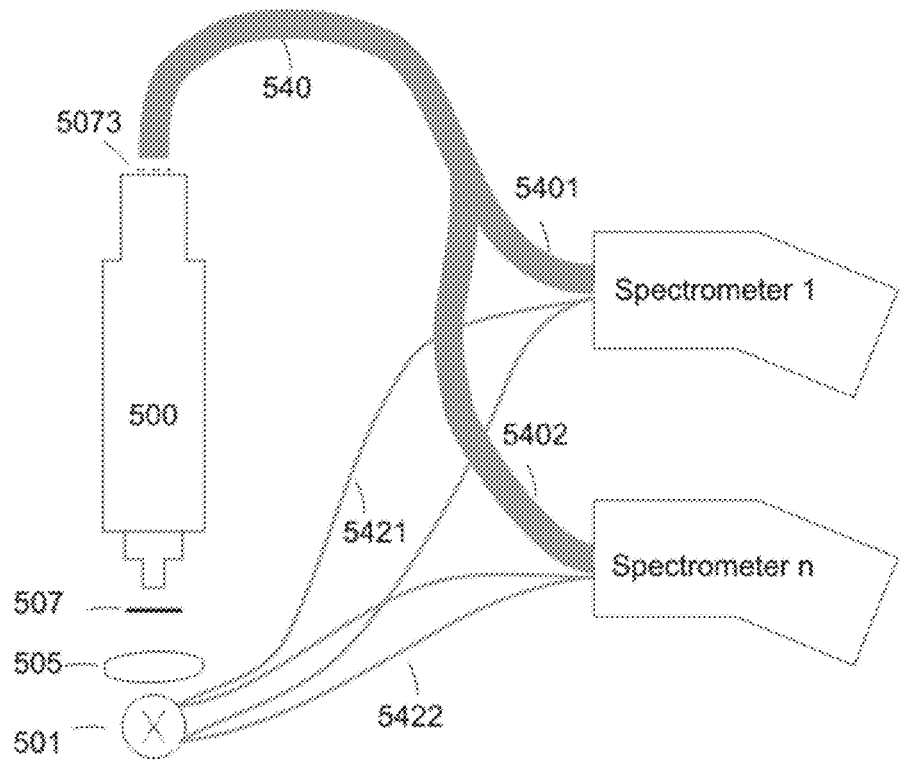
FIG. 5 shows another embodiment with coupling of more than one spectrometer with a branched fiber-optic bundle.

It is known that many image processing systems may have limited capabilities. For example, line imaging spectrometers may have limited spectral range. In such cases it would be desirable to be able to use more than one image processing systems (more than one line imaging spectrometer, each performing analysis in different part of the electromagnetic spectrum, for example). Such a problem can be also resolved with the help of fiber-optic bundles as shown in FIG. 5. In this figure (as in FIG. 4) the imaging system is shown in a form of simplified microscope consisting of a light source 501, a condenser 505, an object 507 and a microscope body 500 with a marked image plane 5073, while spectrometers 1 and 2 represent image processing units. The light from the imaging system is delivered to the image or a processing unit by the means of a fiber optic bundle containing three branches: a main branch 540, which splits into required number of legs, two of which, 5402 and 5402 are shown in the drawing and required number of auxiliary branches represented on the drawing as 5421 and 5422, each of which contains required number of legs (two shown on the drawing) connected to different spectrometers. Each branch and leg may contain any number of optical fibers. Common ends of each branch are used to collect light, while after division into required number of legs, the other ends are bundled together to deliver captured light to the corresponding image analyzers (spectrometers). As in FIG. 4, the main branch 540 captures light either directly from the image plane of a microscope or by the means of some additional optical relay system (not shown on the drawing) similar to the relay optical system 412 of FIG. 4. The auxiliary branches also directly or by means of some relay optical system (not shown on the drawing) capture various reference signals as required, such as from the light source 501, other points of the imaging system (microscope), separate light sources as spectral lamp (also not shown on the drawing) for continuous monitoring of wavelength calibration, from free space (if background subtraction is required), from photometric reference source or from any other points of interest. The number of auxiliary branches can be as large as required. On the common ends, the fibers from all corresponding legs of all branches are aligned into single columns, separate for each spectrometer, which either replace the slits in the corresponding spectrometers, are placed directly in front of the slits or whose images are projected onto the slits by means of some relay optical systems similar to 411/4110 of FIG. 4. Optical coupling systems on each end of fiber-optic bundle may be designed to fulfill conditions (14) and (15).

Figure 6:
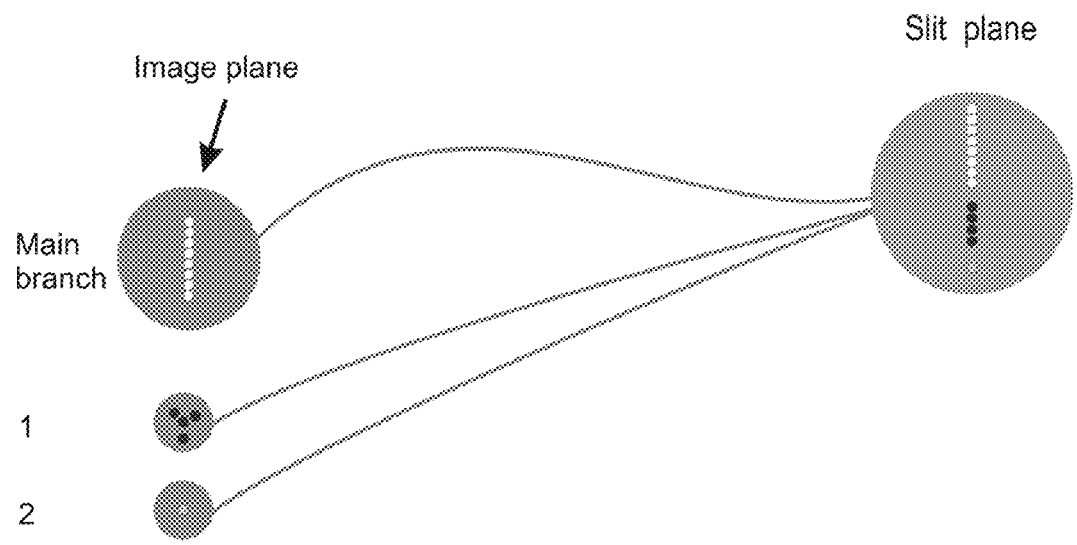
FIG. 6 shows arrangement of the fibers on entry end of the fiber optic bundle used for light transfer between the image plane of the microscope and the entrance slit of a single line imaging spectrometer.

The way in which light from each branch is divided between different image analyzers (spectrometers) depends on application and need. FIG. 6 illustrates an example of such division, when the light from an image and two auxiliary branches whose number can be larger or smaller, is delivered to three spectrometers. The number of spectrometers can be larger or smaller, depending on the needs. The gray circles on the left side of the drawing represent terminator faces of all three branches of fiber-optic bundle, while the small white circles within larger gray represent the ends of individual fibers. The light from each branch is delivered to all three different spectrometers. There are three rows of the fibers in the main branch, four fibers in the auxiliary branch 1 and one fiber in the branch 2. The fibers from a single row are branched to a single spectrometer, where they are aligned into a line (not shown on the drawing). Similarly, the fibers from the auxiliary branch 1, which may contain more fibers than number of spectrometers are equally or not equally distributed between the spectrometers, furthermore, as it is shown in branch 2, the light division can be performed not only by redistribution of the fibers between the legs going to spectrometers, but also can be captured by a single fiber and later branched into a number of fiber-optic legs using fiber-optic power splitters (not shown on the drawing). The fibers from all branches delivered to single spectrometer are arranged into lines in similar fashion as was described earlier. The aligned fibers themselves can act as the slit for spectrometer or light from these lines of the fibers can be coupled directly or indirectly (by means of some optical relay system—not shown on the drawing) to the slit of spectrometer, as in earlier described cases.

Depending on needs, the fibers going to different image analyzers (spectrometers) can be manufactured of different materials. For example, the core of the fibers coupled to spectrometers performing analysis in UV part of the spectrum can be made of fused silica with high concentration of $OH^-$ ions, while the core of fibers predestined for spectrometers performing analysis in infrared can be made of fused silica with low $OH^-$ concentration, or any other more suitable material.

Therefore this is another objective of this invention to provide optimal method and means of coupling a single image forming optical system to plurality of line imaging spectrometers. The coupling is performed using fiber-optic bundle having an image collecting branch which contains a gross number of the fibers arranged into parallel lines and any number of the auxiliary branches. The number of rows in the image collecting branch corresponds to number of spectrometers intended for parallel use and optical properties of fibers in particular rows are selected to secure optimal performance of the line imaging spectrometer cooperating with that row of the fibers. Each auxiliary branch on entry side contains at least as many fibers as many line imaging spectrometers will be used, with optical properties matched to individual spectrometers. The fibers from one line the image collecting (main) branch together with similar fibers from auxiliary branches are delivered to a single leg and arranged into a line in the same order as in the line on entry side with fibers from auxiliary branches placed at the beginning or end of the line.

Figure 7:
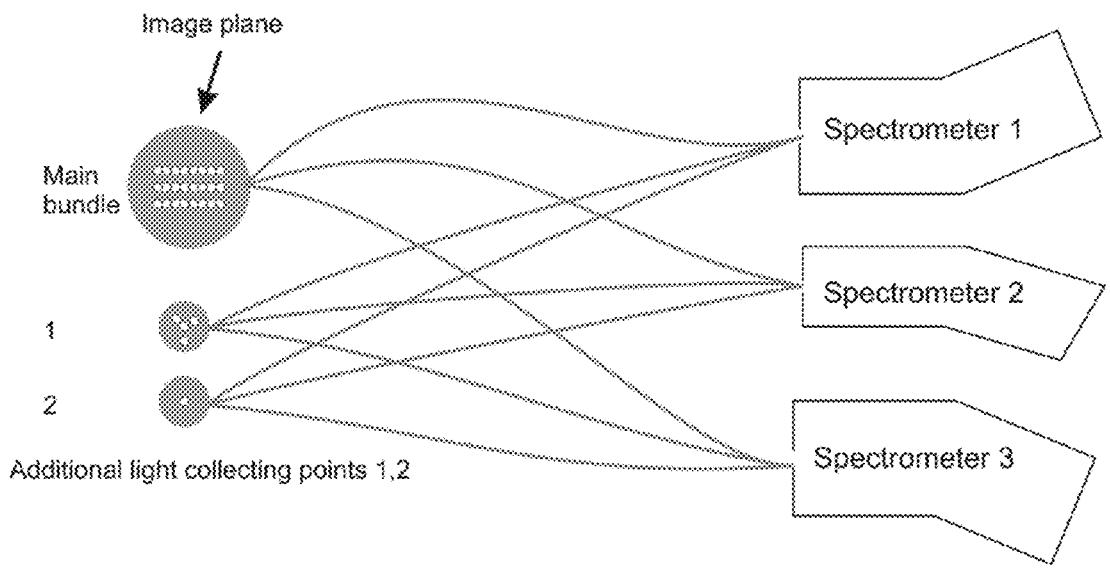
FIG. 7 shows the arrangement of the fibers on each end of the fiber optic bundles used for the radiation transfer between the image plane of the microscope and entrance slits of the line imaging spectrometers when more than one spectrometer is used for spectrum analysis to increase analyzed area of the sample.
Figure 8:
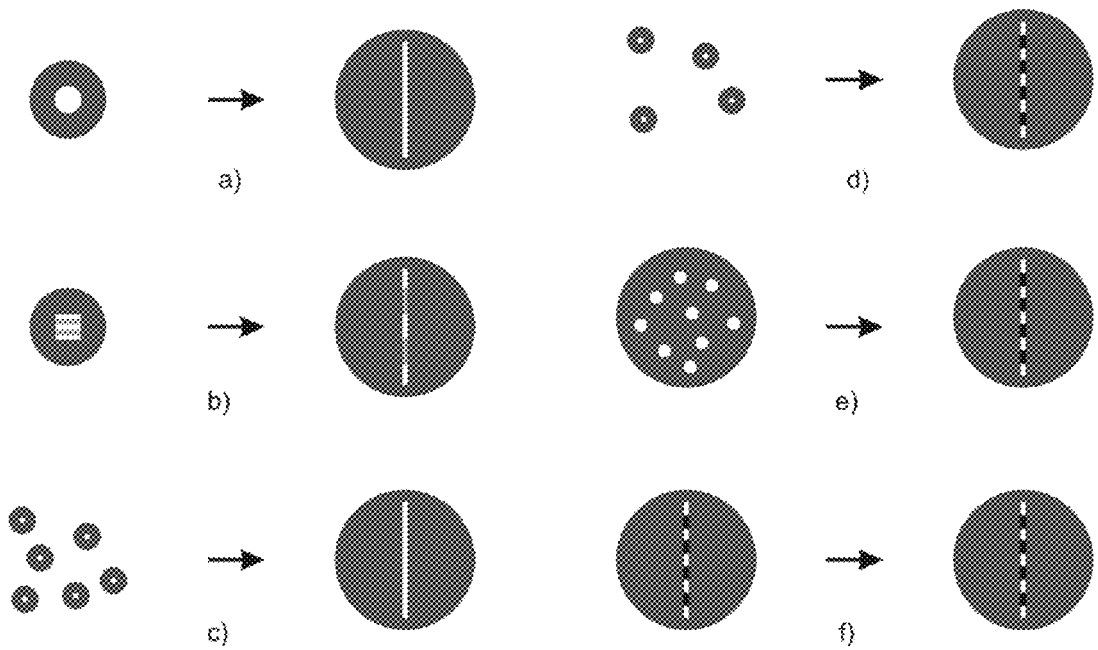
FIG. 8 shows various possible mapping between entry and exit ends of the fiber-optic bundles when a single spectrometer is used for spectrum analysis.

The application of the fiber optic bundles for matching of an imaging system, microscope in particular, to the line imaging spectrometer has many other advantages consisting in that fibers can be used individually to collect the radiation from different points of an optical image (FIG. 8), from different points of the optical system or different optical systems (FIG. 5 and FIG. 7) and to bring them to a single spectrometer and single array for parallel analysis and conversely the radiation from closely placed points in an image can be directed to different analyzers for simultaneous analysis with different devices. Therefore, in one aspect the invention, fiber bundle contains plurality of fibers aligned along a line on the entry and exit faces of the fiber optic bundle. In the preferred embodiment, their order on both ends of the bundle is the same, but it is also possible that the order is different but mapping of fiber from one end to another is known and stored in some memory to allow the identification of the position of each fiber on both ends of the bundle; therefore, to recognize the source of each spectrum produced by the line imaging spectrometer. In a particular case, the group of fibers or each individual fiber on the entry side of the bundle can collect radiation from different points of the same object, different points of the same device, for example as reference directly from the light source used in microscope, or from the light source used for fluorescence excitation or from laser source used for Raman scattering excitation and so on. To facilitate the coupling from different points of the same optical instrument as a microscope or other imaging system, or from different optical systems, each fiber or group of fibers can be terminated with different kind of connectors and terminators. Even the fibers themselves can have different kinds of ending, as for example but not limited to, they can be cut under different angles, highly polished or mat finished, can be grounded on longer distance for coupling scattered radiation incoming from different directions and other terminations, known for these skilled in the art. The radiation delivered to each fiber can be also coupled into the fibers in different ways, for example, using various kinds of focusing optics, scattered light coupling optics, integrating spheres and cavities and so on. Finally, the fibers predestined for coupling radiation from the same sample or the same sample image can be arranged in different ways: in a form of tightly packed line for high resolution imaging along line of limited length, regularly or irregularly distanced along the line to cover larger part of the object, tightly or loosely packed into regular or irregular rectangular or circular pattern, or into regular or irregular mesh with different regular or irregular packing density up to the end that all fibers are individually placed across the large image, as for example but not limited to for simultaneous spectrum collection in number of points of large projection screen, flat panel display, CRTV screen and so on or any other area image or object. The fibers can be also combined in various groups to take, for example, a set of different signals from different places or different devices as for example to take one or more reference signals (for example environmental lighting, different sources lighting, reference source lighting) together with one or more of measured signals from one or more different places and different systems, for example from different places on one or more conveyers. Furthermore, for each separate place and each separate point, one or more fibers could be grouped to collect the same signal but used to deliver by each fiber or group of fibers radiation to different spectrum analyzers, for example performing analysis in different parts of spectrum with different resolutions, using different detectors with different spectral sensitivity and so on. The fibers on collection side can be grouped in different ways and in different regular or irregular ways distributed in space. In particular, all groups or selected groups can contain different numbers of fibers, which could be selectively directed to all or selected analyzers. In particular, one large group can contain a larger number of fibers arranged into a form of two or larger number of parallel lines, with optionally one or more separate fiber groups also containing one or more fibers arranged into any pattern, from which one or more fibers are delivered to one or more analyzers. The fibers from each line and one or more fibers from every, or from selected groups of fibers only, can be bundled into separate legs where on exit end they could be arranged along the line or into any other pattern and delivered to separate spectrum analyzers or other measuring devices. Moving the analyzed image across the light collecting end of the fiber optic bundle allows for consecutive analysis of the same area of the object using different analyzing systems, such as different spectrometers having different spectral resolution and possibly working in different spectral bands using different detectors, sensitive in different spectral ranges. The scanning can be also performed by mechanical movement of the fiber optic bundle with any possible movement mechanisms operated by hand or by any kind of the translator powered by electrical or piezo-electrical driver performing linear or any other programmed translation across the image. Furthermore, this can be performed without any imaging optics when radiation collecting end of the optical bundle is moved in close proximity to the surface of the tested object. This kind of imaging can be also obtained by the movement of the spectrometer itself over the surface of the object in direction perpendicular to the slit length with the slit being in close proximity to the tested surface.

These and other features of the implementations described herein will be evident from the paper, which forms part of this specification, entitled "Applications of Multichannel Imaging Spectrometer" attached hereto and incorporated by reference.

We claim:

1. An optical coupling relay system for optimally coupling an imaging optical system to an image analyzer, comprising: an imaging optical system having a first object plane, an exit pupil, and a first image plane; an image analyzer comprising a second object plane, an entrance pupil, and a second image plane; a detector containing photosensitive material in the second image plane; and an optical coupling relay which projects an image produced in the first image plane by the imaging optical system into the second object plane of the image analyzer thereby to couple the imaging optical system to the image analyzer, and simultaneously projects the exit pupil of the imaging optical system into the entrance pupil of the image analyzer, wherein the image analyzer performs optical analysis of the image projected into the second object plane and the detector detects the optically analyzed image.

2. An optical coupling relay system for optimally coupling an imaging optical system to an image analyzer, comprising: an imaging optical system having a first object plane, an exit pupil, and a first image plane; an image analyzer comprising a second object plane, an entrance pupil, a second image plane, and a detector containing photosensitive material in the second image plane; and an optical coupling relay which projects an image produced in the first image plane by the imaging optical system into the second object plane of the image analyzer thereby to couple the imaging optical system to the image analyzer, and simultaneously projects the exit pupil of the imaging optical system into the entrance pupil of the image analyzer, wherein the optical coupling relay system projects the image produced in the first image plane by the imaging optical system into the second object plane of the image analyzer, with a magnification which secures that RMS radius of the point spread function in the second image plane on the detector of the image analyzer is equal to the length of the minimal resolution element of the detector and wherein the diameter of the entrance pupil of the image analyzer is larger than the diameter of an image of the exit pupil projected by the optical coupling relay system onto the entrance pupil.

3. An optical coupling relay system as claimed in claim 2, wherein the optical coupling relay comprises at least two spatially separated optical components, spaced sufficiently for the placement between them of at least one of a polarizer, an attenuator, a filter, and a beam splitter.

4. An optical coupling relay system as claimed in claim 2, wherein the imaging optical system comprises a microscope, and wherein the optical coupling relay system projects the image produced in the first image plane by the imaging optical system into the second object plane of the image analyzer with a magnification depending on the microscope objective magnification, which allows to match the RMS radius of the point spread function in the second image plane on the detector of the image analyzer so that the RMS radius is equal to the length of the minimal resolution element of the detector and wherein the diameter of the entrance pupil of the image analyzer is larger than the diameter of the image of the exit pupil of the imaging optical system projected by the optical coupling relay system onto the entrance pupil of the image analyzer.

5. An optical coupling relay system as claimed in claim 4, wherein the optical coupling relay is a variable magnification system comprising at least two spatially separated optical components, spaced sufficiently for the placement between them of at least one of a polarizer, an attenuator, a filter, and a beam splitter.

6. An optical coupling relay system as claimed in claim 2, wherein the image produced in the first image plane by the imaging optical system is of wavelength λ, and wherein the imaging optical system is a microscope of system magnification $M_m$ and microscope objective magnification $M_{ob}$, and wherein the imaging optical system is governed by the relationship $M_{ob}=k*N.A._{ob}$, where k is a constant and $N.A._{ob}$ is the numerical aperture of the microscope objective, and wherein the image analyzer is of magnification $M_s$, with constant magnification $M_r$ determined by the relationship $M_r=d/(0.61*\lambda*k*M_m*M_s)$, which secures that RMS radius of the point spread function in the second image plane on the detector of the image analyzer is equal to the length d of the minimal resolution element of the detector.

7. An optical coupling relay system as claimed in claim 6, wherein the optical coupling relay comprises at least two spatially separated optical components, sufficiently spaced for the placement between them of at least one of a polarizer, an attenuator, a filter, and a beam splitter.

8. An optical coupling relay system as claimed in claim 2, where the image analyzer comprises a spectrometer with the entrance pupil placed at a plane of a diffraction grating.

9. An optical coupling relay system for optimally coupling an imaging optical system to an image analyzer, comprising: an imaging optical system having a first object plane, an exit pupil, and a first image plane; an image analyzer comprising a second object plane, an entrance pupil, a second image plane, and a detector containing photosensitive material in the second image plane; and an optical coupling relay which projects an image produced in the first image plane by the imaging optical system into the second object plane of the image analyzer thereby to couple the imaging optical system to the image analyzer, and simultaneously projects the exit pupil of the imaging optical system into the entrance pupil of the image analyzer, wherein the imaging optical system is selected from a telescope, an objective of a television camera, an objective of a photographic camera, a television camera and a microscope, or a combination thereof, wherein the image analyzer is selected from an interferometer and a spectrometer, or a combination thereof, and wherein the detector is selected from a photographic plate, a vidicon, a television camera, a photographic camera and a 1-D or 2-D array of photosensitive photodetectors, or a combination thereof.

10. An optical coupling for coupling an imaging optical system to an image analyzer; the optical system comprising a first object plane, an exit pupil, and a first image plane; the image analyzer comprising a second image plane, an entrance pupil, a second object plane, and a detector containing photosensitive material, the optical coupling comprising a fiber-optic bundle, having an entry end placed one of directly in the first image plane or in a plane of an image produced by an additional fiber entrance optical relay system, and having a second end which is one of placed directly as an object in the second object plane of the image analyzer or projected onto the second object plane of the image analyzer by an additional image forming optical relay system, wherein the fiber-optic bundle comprises optical fibers that are used to increase the numerical aperture of the light beam entering the image analyzer by bending and coiling the fiber-optic bundle used to transfer light from the imaging optical system to the image analyzer.

11. An optical coupling relay system as claimed in claim 10, wherein the image analyzer is a line imaging spectrometer and the fiber optic bundle comprises a single line of fibers at the image analyzer end and the imaging optical system comprises multiple optical fibers coming from the first image plane of the imaging optical system, including one or more optical fibers coming from auxiliary branches delivering radiation from various reference signals, one of which is from a source with known spectrum for continuous verification of wavelength calibration of the spectrometer.

12. An optical coupling relay system as claimed in claim 11, wherein the optical fibers coming from the first image plane of the imaging optical system need not be particularly ordered but where the order of the fibers from both the image analyzer end and the imaging optical system end are known so that each image analyzer end of each optical fiber can be associated with a particular imaging optical system end optical fiber position.

13. The optical coupling as claimed in claim 10, wherein the optical system is at least one of a telescope, an objective of a television camera, an objective of a photographic camera, and a microscope; wherein the image analyzer is at least one of in interferometer and a spectrometer; and wherein the detector is one of a photographic plate, a vidicon, a TV camera, a photographic camera, and a 1-D or 2-D array of photosensitive photodetectors.

14. An optical coupling relay system for optimally coupling an imaging optical system to an image analyzer, comprising: an imaging optical system having a first object plane, an exit pupil, and a first image plane; an image analyzer comprising a second object plane, an entrance pupil, and a second image plane; a detector containing photosensitive material in the second image plane; and an optical coupling relay which projects an image produced in the first image plane by the imaging optical system into the second object plane of the image analyzer thereby to couple the imaging optical system to the image analyzer, and simultaneously projects the exit pupil of the imaging optical system into the entrance pupil of the image analyzer, wherein the optical coupling relay comprises a fiber-optic bundle comprising one or more optical fibers and having an imaging optical system end placed directly in the first image plane of the imaging optical system and having an image analyzer end placed directly as an object in the second object plane of the image analyzer, wherein the image analyzer performs optical analysis of the image projected into the second object plane and the detector detects the optically analyzed image.

15. An optical coupling as claimed in claim 14, wherein the imaging optical system is a microscope, and the diameter $d_f$ of the optical fibers is selected to conform to the relationship $d_f = 40 * \lambda * M_m$, where $\lambda$ is the wavelength of light used, and $M_m$ is the system magnification of the microscope and wherein the optical fibers provide optimal coupling of the image produced on the first image plane of the imaging optical system to the imaging optical system end of the fiber-optic bundle.

16. An optical coupling relay system as claimed in claim 14, wherein the image analyzer is composed of a plurality of separate image analyzers, wherein coupling is performed using a fiber-optic bundle having an image collecting branch which contains a gross number of the optical fibers and any number of auxiliary branches, and wherein the number of optical fibers in each auxiliary branch corresponds to at least the number of image analyzers intended for parallel use and the optical properties of the optical fibers connecting to each image analyzer are selected to secure optimal performance of each particular image analyzer.

17. An optical coupling relay system as claimed in claim 16, wherein the plurality of image analyzers comprises a plurality of line imaging spectrometers and the optical fibers reaching the individual line imaging spectrometers are arranged in lines which are delivered or projected onto the entrance pupils of the line imaging spectrometers.

18. An optical coupling relay system as claimed in claim 17, wherein the lines of optical fibers reaching the individual line imaging spectrometers on the image analyzer end of the fiber optic bundle are arranged on the imaging optical system end into parallel lines, each separate line corresponding to separate line imaging spectrometers.

19. An optical coupling relay system as claimed in claim 17, wherein the plurality of line imaging spectrometers consists of line imaging spectrometers having the same specifications in order to acquire spectral information from a larger area of the first image plane of the imaging optical system.

20. An optical coupling relay system as claimed in claim 17, wherein the plurality of line imaging spectrometers consist of line imaging spectrometers of different specifications in order to acquire a larger amount of spectral information for the same or adjacent lines on the first image plane of the imaging optical system.

21. An optical coupling relay system as claimed in claim 17, wherein a hyperspectral cube is obtained by scanning by one of mechanical, electronic, electromagnetic, or optical mechanisms of the image in the first image plane of the imaging optical system in the direction perpendicular to the optical fibers in the imaging optical system end of the fiber-optic bundle.

22. An optical coupling relay system for optimally coupling an imaging optical system to an image analyzer, comprising: an imaging optical system having a first object plane, an exit pupil, and a first image plane; an image analyzer comprising a second object plane, an entrance pupil, a second image plane, and a detector containing photosensitive material in the second image plane; and an optical coupling relay which projects an image produced in the first image plane by the imaging optical system into the second object plane of the image analyzer thereby to couple the imaging optical system to the image analyzer, and simultaneously projects the exit pupil of the imaging optical system into the entrance pupil of the image analyzer wherein the optical coupling relay comprises a fiber-optic bundle comprising one or more optical fibers wherein the image produced in the first image plane by the imaging optical system is projected onto the imaging optical system end of the fiber-optic bundle by a secondary relay optical system and having an image analyzer end of the fiber-optic bundle placed directly as an object in the second object plane of the image analyzer.

23. An optical coupling as claimed in claim 22 wherein a magnification of the secondary relay optical system secures that RMS radius of the point spread function projected on the imaging optical system end of the fiber-optic bundle is larger than the diameter of the optical fibers within the bundle, resulting in at least 2 separate optical fibers collecting across the RMS diameter.

24. An optical coupling relay system for optimally coupling an imaging optical system to an image analyzer, comprising: an imaging optical system having a first object plane, an exit pupil, and a first image plane; an image analyzer comprising a second object plane, an entrance pupil, and a second image plane; a detector containing photosensitive material in the second image plane; and an optical coupling relay which projects an image produced in the first image plane by the imaging optical system into the second object plane of the image analyzer thereby to couple the imaging optical system to the image analyzer, and simultaneously projects the exit pupil of the imaging optical system into the entrance pupil of the image analyzer, wherein the optical coupling relay comprises a fiber-optic bundle comprising one or more optical fibers and having an imaging optical system end placed directly in the first image plane of the imaging optical system and having an image analyzer end projected by a tertiary relay optical system onto the second object plane of the image analyzer, wherein the image analyzer performs optical analysis of the image projected into the second object plane and the detector detects the optically analyzed image.

25. An optical coupling relay system as claimed in claim 24, wherein a magnification of the tertiary relay optical system together with the magnification of the image analyzer produces an image of a single optical fiber on the second image plane of the image analyzer not larger than the length of the minimal resolution element of the detector.

* * * * *